United States Patent [19]
Fuse

[11] 3,949,166
[45] Apr. 6, 1976

[54] SYSTEM FOR USE IN TELEVISION RECEIVERS FOR PROVIDING IMPROVED SHARPNESS OF IMAGES

[75] Inventor: Yuzo Fuse, Tokyo, Japan
[73] Assignee: Sony Corporation, Tokyo, Japan
[22] Filed: Nov. 5, 1974
[21] Appl. No.: 521,202

[30] Foreign Application Priority Data
Nov. 12, 1973  Japan.............................. 48-126960

[52] U.S. Cl......... 178/7.5 R; 178/DIG. 34; 315/382
[51] Int. Cl.²........................................... H04N 5/44
[58] Field of Search... 178/DIG. 25, DIG. 34, 7.5 R; 358/71; 315/382, 31 TV

[56] References Cited
UNITED STATES PATENTS

| | | | |
|---|---|---|---|
| 2,784,342 | 5/1957 | Van Overbeek...................... | 358/71 |
| 2,994,803 | 8/1961 | Goldberg............................. | 315/382 |
| 3,038,101 | 6/1962 | Schlesinger......................... | 315/382 |

OTHER PUBLICATIONS
McMann et al., Improved Signal Processing Techniques for Color Television Broadcasting, Journal of the SMPTE, Vol. 77, Mar. 1968, p. 221.

*Primary Examiner*—George H. Libman
*Attorney, Agent, or Firm*—Lewis H. Eslinger; Alvin Sinderbrand

[57] ABSTRACT

For improving the sharpness of images produced on the screen of a cathode ray tube in a television receiver or other video signal reproducing device, a control signal is produced to vary in response to transient changes in the level of a video signal by which each electron beam in the cathode ray tube is density-modulated, and such control signal is supplied to a beam focusing electrode of the cathode ray tube so as to control the shape of a beam landing spot on the screen and thereby to prevent the image on the screen from becoming vague at its contours.

8 Claims, 13 Drawing Figures

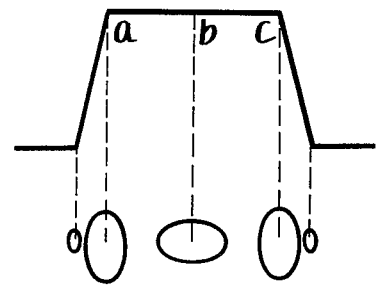
Fig. 1A
Fig. 1B
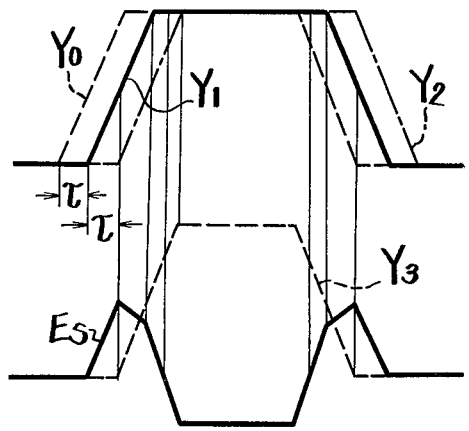
Fig. 3A
Fig. 3B
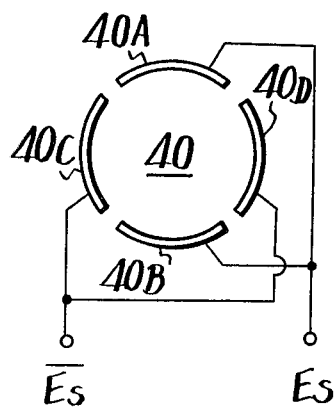
Fig. 4
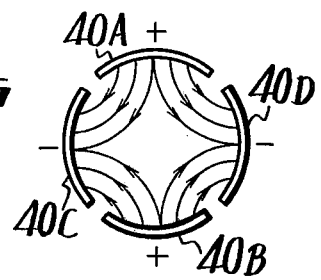
Fig. 5
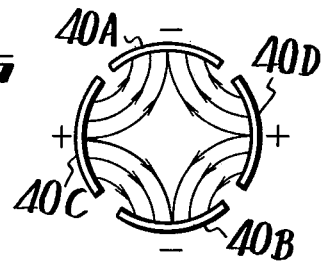
Fig. 6

SYSTEM FOR USE IN TELEVISION RECEIVERS FOR PROVIDING IMPROVED SHARPNESS OF IMAGES

BACKGROUND OF THE INVENTION

1. Field of the Invention

This invention generally relates to television receivers or other video signal reproducing devices, and more particularly is directed to an improvement in such devices for obtaining reproduced images with increased sharpness.

2. Description of the Prior Art

When an image is reproduced on the phosphor screen of a cathode ray tube in a television receiver or the like, the electron beam current in the cathode ray tube increases at a high luminance portion of the image so that the size of the landing spot of the electron beam on the phosphor screen becomes large and hence the sharpness of the reproduced image is inevitably lowered.

By way of example, when a video signal is changed between black and white levels, with relatively sharp rising-up and falling-down or transient changes of the level of the video signal, the size of an electron beam landing spot on the phosphor screen corresponding to a point where the video signal is risen up to the white level and a point where the signal is falling down from the white level becomes relatively large. Therefore, a corresponding portion of the image on the phosphor screen has a skirt like shape in the horizontal direction and hence the marginal portion of a bright area of the image is undefined or becomes vague to lower the sharpness thereof. For example, if a rectangular bright image portion of a predetermined size is desired to be reproduced on the phosphor screen of the cathode ray tube at its substantial center by a so-called window signal, as mentioned above, the size of the landing spot of the electron beam on the phosphor screen becomes large at the horizontal and vertical margins of the rectangular bright image portion. Thus, the bright image portion is expanded in both the horizontal and vertical directions with the result that its contour is made vague.

SUMMARY OF THE INVENTION

Accordingly, object of the present invention is to provide an a television receiver or other device for reproducing video images with improved sharpness.

Another object of the present invention is to provide an improved television receiver or the like in which an electron beam directed to land on a phosphor screen in a cathode ray tube has the in shape of its landing spot on the phosphor screen varied in response to variations in the level of video signals to be reproduced.

A further object of the present invention is to provide an improved television receiver, as aforesaid, in which the shape of the landing spot of an electron beam on a phosphor screen in a cathode ray tube is varied by means of a control signal which changes in response to variations in the level of video signals supplied to the cathode ray tube and which is applied to a focusing lens for the electron beam.

The above, and other objects features and advantages of the present invention, will become apparent from the following description taken in conjunction with the accompanying drawings.

BRIEF DESCRIPTION OF THE DRAWINGS

FIGS. 1A and 1B are schematic diagrams to which reference will be made in explaining the present invention.

FIGS. 3A and 3B are schematic wave form diagrams to which reference will be made in explaining the operation of the television receiver shown in FIG. 2.

FIG. 4 is a schematic view of a focusing lens electrode that may be used for controlling the shape of a beam spot on a phosphor screen in accordance with the present invention.

FIGS. 5 and 6 are diagrammatic views illustrating distorted electrical fields produced by the focusing lens electrode of FIG. 4 for different operating conditions of the television receiver according to this invention.

DESCRIPTION OF THE PREFERRED EMBODIMENT

Generally, in accordance with the present invention, the shape of the beam landing spot on the phosphor screen of a cathode ray tube is changed in response to transient or major variations in the level of a video signal applied to the cathode ray tube to thereby reproduce an image with sufficient sharpness in both the horizontal and vertical directions.

More particularly, as shown in FIGS. 1A and 1B, the shape of an electron beam landing spot on the phosphor screen of a cathode ray tube is elongated in the direction perpendicular to the horizontal or line-scanning direction at positions where the level of a video signal which density-modulates the electron beam is rising up to a high or white level and is falling down from such high or white level, as at $a$ and $c$ on FIG. 1A, and the shape of the beam landing spot is elongated in the horizontal or line-scanning direction when the level of the video signal is maintained substantially constant at the high or white level after rising thereto, as at $b$ on FIG. 1A.

Figure 2:
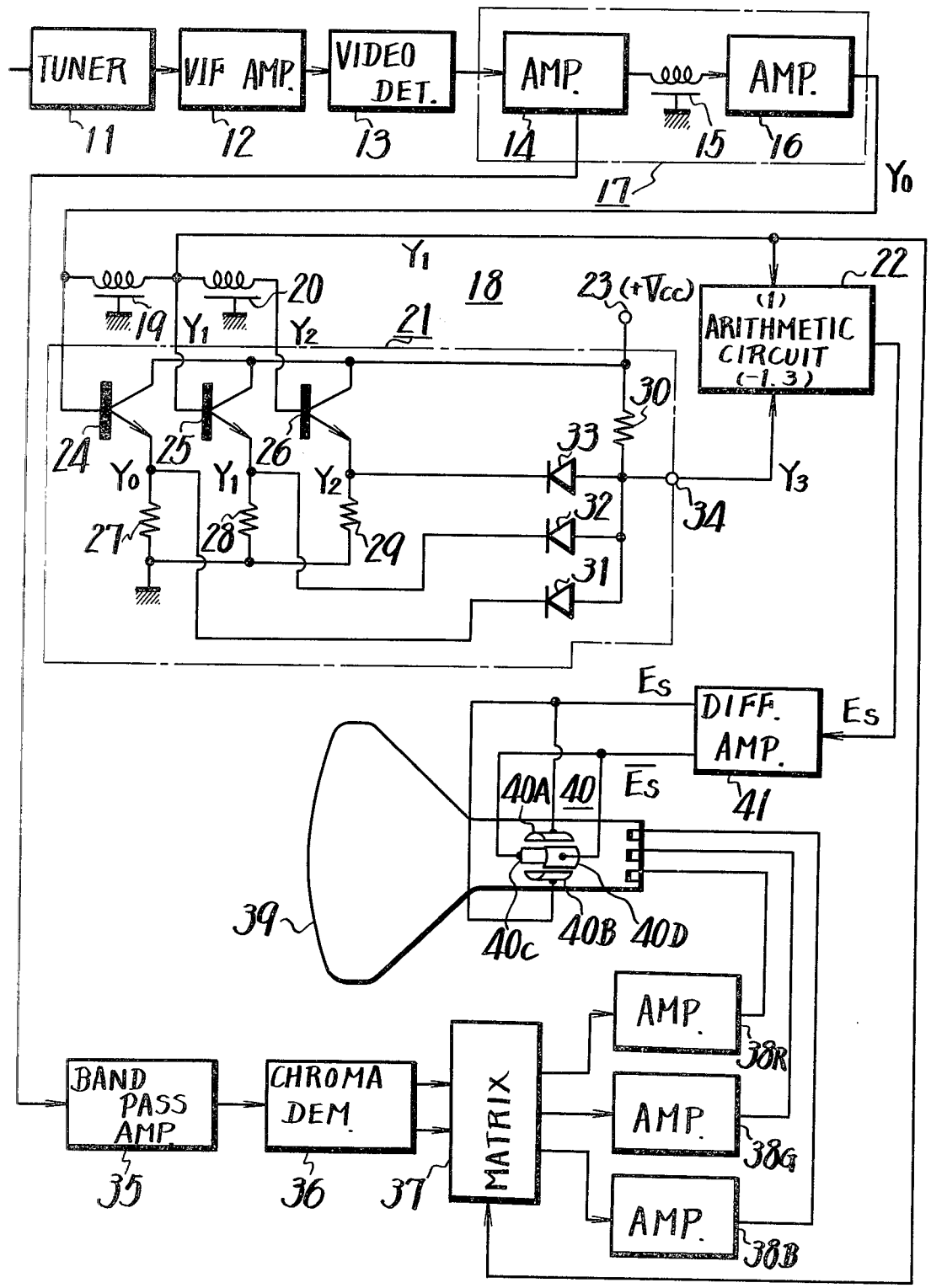
FIG. 2 is a schematic circuit diagram showing one example of a television receiver according to the present invention.

Referring now to FIG. 2, it will be seen that, in a color television receiver to which the present invention may be applied, a received color television signal is supplied through a tuner 11 and a video intermediate frequency amplifier 12 to a video detector 13 whose output signal is supplied to a video amplifier circuit 17 consisting of an amplifier 14, a delay line 15 and an amplifier 16. The video amplifier 17 produces a luminance signal $Y_o$. Such luminance signal $Y_o$ is applied to a control signal producing circuit 18 which, as hereinafter described in detail, produces a control signal for controlling the aspect ratio of an electron beam landing spot on the screen of a cathode ray tube. The control signal producing circuit 18 is formed of, for example, two delay lines 19 and 20 which have the same delay time $\tau$, a minimum value detecting circuit 21 and an arithmetic circuit 22. The minimum value detecting circuit 21 is so formed that a voltage source terminal 23 of $+V_{cc}$ is grounded through the collector-emitter paths of transistors 24, 25 and 26 and resistors 27, 28 and 29, and is respectively, and the terminal 23 is further connected to the emitters of the transistors 24, 25 and 26 through a resistor 30 and diodes 31, 32 and 33, respectively.

The original luminance signal $Y_O$ is delayed in the delay line 19 by the time $\tau$ to provide a signal $Y_1$ and the signal $Y_1$ is further delayed in the delay line 20 by the time $\tau$ to provide a signal $Y_2$. These signals $Y_0$, $Y_1$ and $Y_2$ are supplied to the bases of the transistors 24, 25 and 26, respectively. The delay time $\tau$ is selected to be substantially equal to a half of, for example, the rising up time within which the luminance signal $Y_O$ is changed from its black level to its white level or the falling down time within which the luminance signal $Y_O$ is changed from its white level to its black level, as shown in FIG. 3A. In practice, it is sufficient to select a delay time $\tau$ to be about $0.1\mu$ sec. Thus, at the emitters of the transistors 24, 25 and 26 there are produced the signals $Y_0$, $Y_1$ and $Y_2$, respectively. As a result, at a connection point 34 between the resistor 30 and the common terminal of the diodes 31 to 33, there is obtained a signal $Y_3$ which corresponds, at any instant, to the minimum value of the signals $Y_0$, $Y_1$ and $Y_2$ at such instant, as shown in FIG. 3B. This signal $Y_3$ and the once delayed luminance signal $Y_1$ are applied to the arithmetic circuit 22 to produce, for example, a voltage signal $E_S$ ($= Y_1 - 1.3Y_3$) which is changed in response to the variation in the level of the luminance signal $Y_1$, as shown in FIG. 3B, and which is used to control the aspect ratio of the beam landing spot.

A composite color television signal derived from the amplifier 14 of the video amplifier circuit 17 is applied to a band pass amplifier 35 to produce a chrominance signal which is then applied to a chrominance demodulator 36 for obtaining color difference signals R-Y and B-Y. The color difference signals R-Y and B-Y obtained from the chrominance demodulator 36 are applied to a matrix circuit 37 which is also supplied with the once delayed luminance signal $Y_1$ obtained from the delay line 19. Thus, the matrix circuit 37 produces color signals of R(red), G(green) and B(Blue).

These color signals are supplied through amplifiers 38R, 38G and 38B to the respective cathodes of a color cathode ray tube 39 to density-modulate electron beams which are intended to land on and excite red, green and blue phosphors, respectively, making up the screen of such tube. Simultaneously, in accordance with this invention, the signal voltage $E_S$ obtained from the arithmetic circuit 22 is used to control the aspect ratios or shapes of the beam landing spots of the respective electron beams on the phosphor screen of the color cathode ray tube 39.

It is sufficient for changing the aspect ratio of each beam landing spot that, by way of example, the focus conditions for the respective electron beam are changed in the horizontal and vertical directions. In order to achieve the foregoing, a focus electrode 40 in the cathode ray tube 39 which focus electrode may be the fourth grid electrode when the cathode ray tube employs an electron gun of a unpotential type, or the third grid electrode when the cathode ray tube employs an electron gun of a bipotential type, is divided into four plate electrodes arranged as a pair of opposing plate electrodes 40A and 40B spaced apart in the vertical direction and another pair of opposing plate electrodes 40C and 40D spaced apart in the horizontal direction, as shown in FIG. 4. The control signal voltage $E_s$ is applied to a differential amplifier 41 (FIG. 2) to produce the signal voltages $E_s$ and $\overline{E}_s$ of the opposite polarities. The control signal voltage $E_s$ is applied to the plate electrodes 40A and 40B in addition to a predetermined focus voltage, while the control signal voltage $\overline{E}_s$ is applied to the electrodes 40C and 40D in addition to the predetermined focus voltage.

Figure 7:
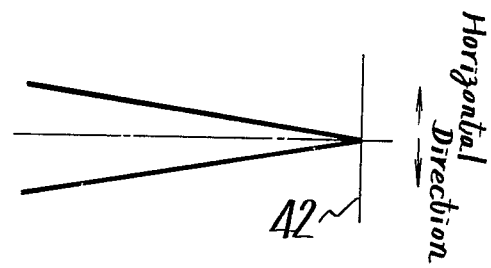
FIGS. 7 and 8 are diagrammatic views illustrating the focusing of an electron beam in the horizontal and vertical directions, respectively, when the electrical field for focusing such beam is distorted as shown on FIG. 5.
Figure 8:
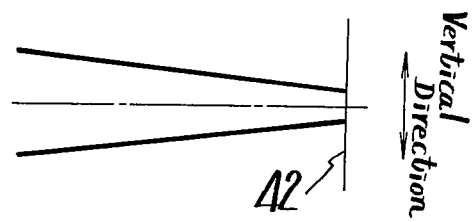

As will be apparent from FIGS. 3A and 3B, at the rising-up portion of the luminance signal $Y_1$ which density-modulates each electron beam, and for a short time following such rising-up of the luminance signal $Y_1$, the control signal voltage $E_s$ is positive and, of course, the control signal voltage $\overline{E}_s$ is negative. Similarly, at the falling-down portion of the luminance signal $Y_1$ and for a short time immediately preceding such falling-down portion, the control signal voltage $E_s$ is positive and the control signal voltage $\overline{E}_s$ is negative. Therefore, at such rising-up and falling-down portions of luminance signal $Y_1$, the potential applied to focus electrode plates 40A and 40B which are spaced apart in the vertical direction becomes higher than that applied to the focus electrode plates 40C and 40D which are spaced apart in the horizontal direction, with the result that electric fields within the plate electrodes are distorted, as shown in FIG. 5 by arrows, to generate an astigmatism in the beam focusing field. Thus, the respective electron beams come to be in a so-called just focused condition on a phosphor screen 42 in the horizontal direction as shown in FIG. 7, but come to be in a so-called under focused condition on the phosphor screen 42 in the vertical direction as shown in FIG. 8. As a result, the beam landing spots are provided with oval shapes which are elongated in the direction perpendicular to the horizontal or line-scanning direction, as shown in FIG. 1B.

On the other hand, in the interval during which the luminance signal $Y_1$ is substantially constant at a high level, and more specifically from shortly after the rising-up portion of the luminance signal $Y_1$ until shortly before the falling-down portion of such luminance signal, the control signal voltage $E_s$ is negative, as shown on FIG. 3B, while the control signal voltage $\overline{E}_s$ of opposite polarity is positive. Therefore, during such interval, the potential applied to focus electrode plates 40A and 40B is substantially less than the potential applied to the focus electrode plates 40C and 40D, with the result that the focusing field is distorted as indicated by the arrows on FIG. 6. Such distortion or astigmatism of the focusing field causes each electron beam to have an oval-shaped beam landing spot on the phosphor screen, but in this case the oval-shaped beam landing spot is elongated in the horizontal or line-scanning direction, as shown on FIG. 1B.

Figure 9:
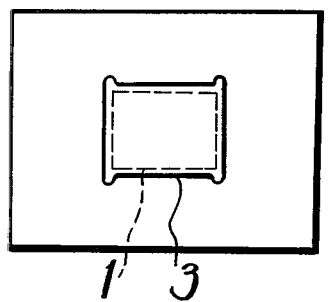
FIG. 9 is a diagrammatic view showing a comparison of an idealized rectangular bright image portion with the corresponding image portion produced according to this invention.
Figure 10:
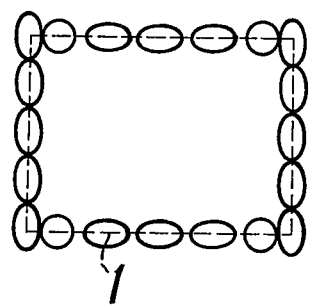
FIG. 10 is a diagrammatic view showing the shapes of the beam landing spots provided along the vertical and horizontal margins of a rectangular bright image portion according to this invention.
Figure 11:
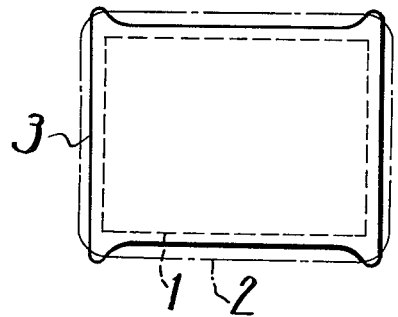
FIG. 11 is an enlarged diagrammatic view of the bright image portions of FIG. 9 further compared with the bright image portion that would be produced in the absence of the present invention.

Accordingly, when a rectangular bright portion is produced on the screen of the cathode ray tube by a so-called window signal which would ideally be represented by the dotted line 1 on FIGS. 9 and 11, the shapes of the beam landing spots at the edges or vertical and horizontal margins of the rectangular bright portion becomes as shown in FIG. 10. Therefore, the beam landing spots are relatively narrow in the horizontal or line-scanning direction along the opposite vertical margins of the rectangular bright portion of the reproduced image, while the beam landing spots are relatively narrow in the vertical direction, that is, in the direction perpendicular to the line-scanning direction, along the opposite horizontal margins of the rectangular bright portion so that the latter is actually confined within the contour or line 3 on FIGS. 9 and 11. Although such contour or line 3 extends horizontally and vertically beyond the idealized representation 1 of the window signal, it will be noted that the contour or line 3 obtained according to this invention conforms more closely to the idealized representation 1 of the window signal at the vertical and horizontal margins than the rectangular bright portion indicated by the contour or line 2 on FIG. 11 which would result in the absence of the present invention, that is, if the beam landing spots of increased size were of circular shape along the margins of the rectangular bright portion. By providing the beam landing spots along the vertical or side margins with oval shapes elongated in the vertical direction, the effect thereof is to reduce the size of such beam landing spots in the horizontal or line-scanning direction along such margins so as to improve the sharpness of the image in the horizontal direction. Similarly, by providing the beam landing spots along the horizontal or top and bottom margins with oval shapes elongated in the horizontal direction, the effect thereof is to reduce the size of such beam landing spots in the vertical direction along the top and bottom margins so as to improve the sharpness of the image in the vertical direction. Thus, the contour becomes clear in both the horizontal and vertical directions.

As described above, in accordance with the present invention, a picture which has an improved sharpness in both the horizontal and vertical directions or a clear contour can be obtained.

It will be apparent that there are various circuits which may produce the control signal $E_s$ used for controlling the aspect ratio of the beam landing spots, other than the circuit 18 shown on FIG. 2.

Further, in changing the aspect ratio of the beam landing spots, the control signals $E_s$ and $E_s$ may be applied to electrodes which may form a focus lens, as in the illustrated embodiment, or to other electrodes included as parts of the electron gun, or to a magnetic field generator provided outside of the cathode ray tube.

It is, of course, possible that the present invention can be employed in a black and white television receiver rather than in a color television receiver as shown on FIG. 2.

It will be apparent that many modifications and variations can be effected by one skilled in the art without departing from the spirit and scope of the novel concepts of the present invention. Accordingly, the scope of the present invention should be determined by the appended claims.

I claim as my invention:

1. In a video signal reproducing device including a cathode ray tube having a phosphor screen, beam generating means disposed in said tube and directing at least one electron beam toward said screen for impingement thereon at a respective beam landing spot, signal supplying means receiving a video signal to be reproduced and being connected with said beam generating means for causing the latter to density-modulate each said beam in accordance with the variations in the level of said video signal, and focusing means producing a focusing field for focusing each said beam at said screen while the beam is made to scan the screen in a line-scanning direction and in a direction perpendicular to said line-scanning direction; the improvement comprising circuit means for producing a control signal which varies in response to transient changes in the level of said video signal being reproduced, and means receiving said control signal to produce a corresponding varying field acting on each said beam for decreasing the size of said beam landing spot in said line-scanning direction relative to the size thereof in said direction perpendicular to the line-scanning direction upon said transient changes in the level of the video signal and for decreasing the size of the beam landing spot in said direction perpendicular to the line-scanning direction relative to the size thereof in said line-scanning direction in the intervals between said transient changes, whereby to improve the sharpness of definition of the margins of bright image portions reproduced from said video signal.

2. A video signal reproducing deviced according to claim 1; in which said means receiving said control signal to produce a correspondingly varying field acting on each said beam is connected with said focusing means for causing said varying field to be introduced as a varying astigmatism in said focusing field.

3. A video signal reproducing device according to claim 2; in which said focusing means includes an electrode having first and second pairs of electrode plates which are spaced apart in said line-scanning direction and in said direction perpendicular thereto, respectively, for the passage of each said electron beam between said pairs of electrode plates; and in which said means receiving said control signal applies the latter with opposite polarities to said first and second pairs of electrode plates, respectively.

4. A video signal reproducing device according to claim 3; in which said means receiving said control signal includes a differential amplifier with an input receiving said control signal from said circuit means and with first and second outputs respectively connected to said first and second pairs of electrode plates.

5. A video signal reproducing device according to claim 1; in which said circuit means for producing the control signal comprises a first delay means for delaying the video signal, a second delay means for further delaying the once delayed video signal from said first delay means, combining circuit means for synthesizing the non-delayed video signal, the once delayed video signal and the twice delayed video signal, and mixing means for mixing said once delayed video signal with an output of said combining circuit means.

6. A video signal reproducing device according to claim 5; in which said signal supplying means supplies said once delayed video signal to said beam generating means.

7. A video signal reproducing device according to claim 6; in which said combining circuit means comprises means for producing a signal having a value which, at any instant, corresponds to the minimum one of said non-delayed, once delayed and twice delayed video signals at such instant.

8. A video signal reproducing device according to claim 7; in which said mixing means comprises an arithmetic circuit for mxing said once delayed video signal and said output of the combining circuit means with a predetermined level difference therebetween and with predetermined polarities of the respective signals.

* * * * *